(12) United States Patent
Puzio

(10) Patent No.: US 8,328,204 B2
(45) Date of Patent: Dec. 11, 2012

(54) TRIGGER-STYLE PTO-ACTUATION

(75) Inventor: Daniel Puzio, Baltimore, MD (US)

(73) Assignee: Black & Decker Inc., Newark, DE (US)

( * ) Notice: Subject to any disclaimer, the term of this patent is extended or adjusted under 35 U.S.C. 154(b) by 1335 days.

(21) Appl. No.: 11/911,013

(22) PCT Filed: Apr. 13, 2006

(86) PCT No.: PCT/US2006/013827
§ 371 (c)(1),
(2), (4) Date: Oct. 9, 2007

(87) PCT Pub. No.: WO2006/113329
PCT Pub. Date: Oct. 26, 2006

(65) Prior Publication Data
US 2008/0185794 A1 Aug. 7, 2008

Related U.S. Application Data

(60) Provisional application No. 60/672,532, filed on Apr. 19, 2005.

(51) Int. Cl.
*B23B 31/16* (2006.01)
(52) U.S. Cl. ............... 279/60; 279/134; 279/902
(58) Field of Classification Search ......... 279/60–65, 279/134, 140, 902; *B32B 31/16*
See application file for complete search history.

(56) References Cited

U.S. PATENT DOCUMENTS

| | | | | |
|---|---|---|---|---|
| 4,260,169 A | * | 4/1981 | Hall | 279/62 |
| 4,317,578 A | * | 3/1982 | Welch | 279/60 |
| 4,358,230 A | * | 11/1982 | Rohlin | 408/124 |
| 4,526,497 A | * | 7/1985 | Hatfield | 408/240 |
| 4,536,113 A | * | 8/1985 | Hatfield | 409/234 |
| 4,669,932 A | * | 6/1987 | Hartley | 408/239 R |
| 4,848,779 A | * | 7/1989 | Wheeler et al. | 279/60 |
| 4,958,840 A | * | 9/1990 | Palm | 279/62 |
| 5,195,760 A | * | 3/1993 | Wheeler et al. | 279/60 |
| 6,056,298 A | * | 5/2000 | Williams | 279/150 |
| 6,488,286 B2 | * | 12/2002 | Yaksich | 279/62 |
| 6,488,287 B2 | * | 12/2002 | Gaddis et al. | 279/63 |
| 6,843,484 B2 | * | 1/2005 | Schroeder | 279/60 |
| 7,021,400 B2 | * | 4/2006 | Oretti | 173/29 |

(Continued)

FOREIGN PATENT DOCUMENTS
WO WO 02/058893 A1 * 8/2002

*Primary Examiner* — Eric A Gates
(74) *Attorney, Agent, or Firm* — Kofi Schulterbrandt; Scott B. Markow; Adan Ayala

(57) ABSTRACT

In a power driver, a power take off (PTO) arrangement (to open/close a chuck) includes: a chuck actuating shaft and a coaxial PTO actuator shaft axially displaceable along, yet rotationally locked together about, a first axis of the power driver; an input shaft, supporting jaws of the chuck, and concentric to at least a portion of the chuck actuating shaft and a portion of the PTO actuator shaft; relative rotation between the chuck actuating shaft and the input shaft selectively being prevented and being caused by first and second configurations of the chuck actuating shaft and the PTO actuator shaft, respectively; and a PTO-control member, displaceable between first and second positions along a second axis parallel to the first axis, and coupled to adjust at least one of the chuck actuating shaft and the PTO actuator to achieve the first and second configurations, respectively.

28 Claims, 7 Drawing Sheets

U.S. PATENT DOCUMENTS

| | | | |
|---|---|---|---|
| 7,328,904 B2 * | 2/2008 | Schell et al. | 279/60 |
| 7,537,421 B2 * | 5/2009 | Puzio et al. | 408/124 |
| 7,547,165 B2 * | 6/2009 | Puzio | 408/124 |
| 7,588,398 B2 * | 9/2009 | Puzio et al. | 408/124 |
| 7,588,399 B2 * | 9/2009 | Puzio et al. | 408/124 |
| 7,645,101 B2 * | 1/2010 | Puzio | 408/124 |
| 7,677,844 B2 * | 3/2010 | Schell et al. | 408/9 |
| 7,690,658 B2 * | 4/2010 | Puzio et al. | 279/60 |
| 2006/0188350 A1 * | 8/2006 | Gehret et al. | 408/240 |
| 2007/0068692 A1 * | 3/2007 | Puzio | 173/217 |

\* cited by examiner

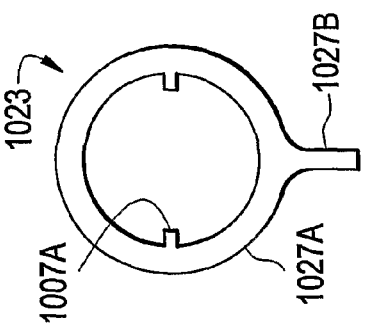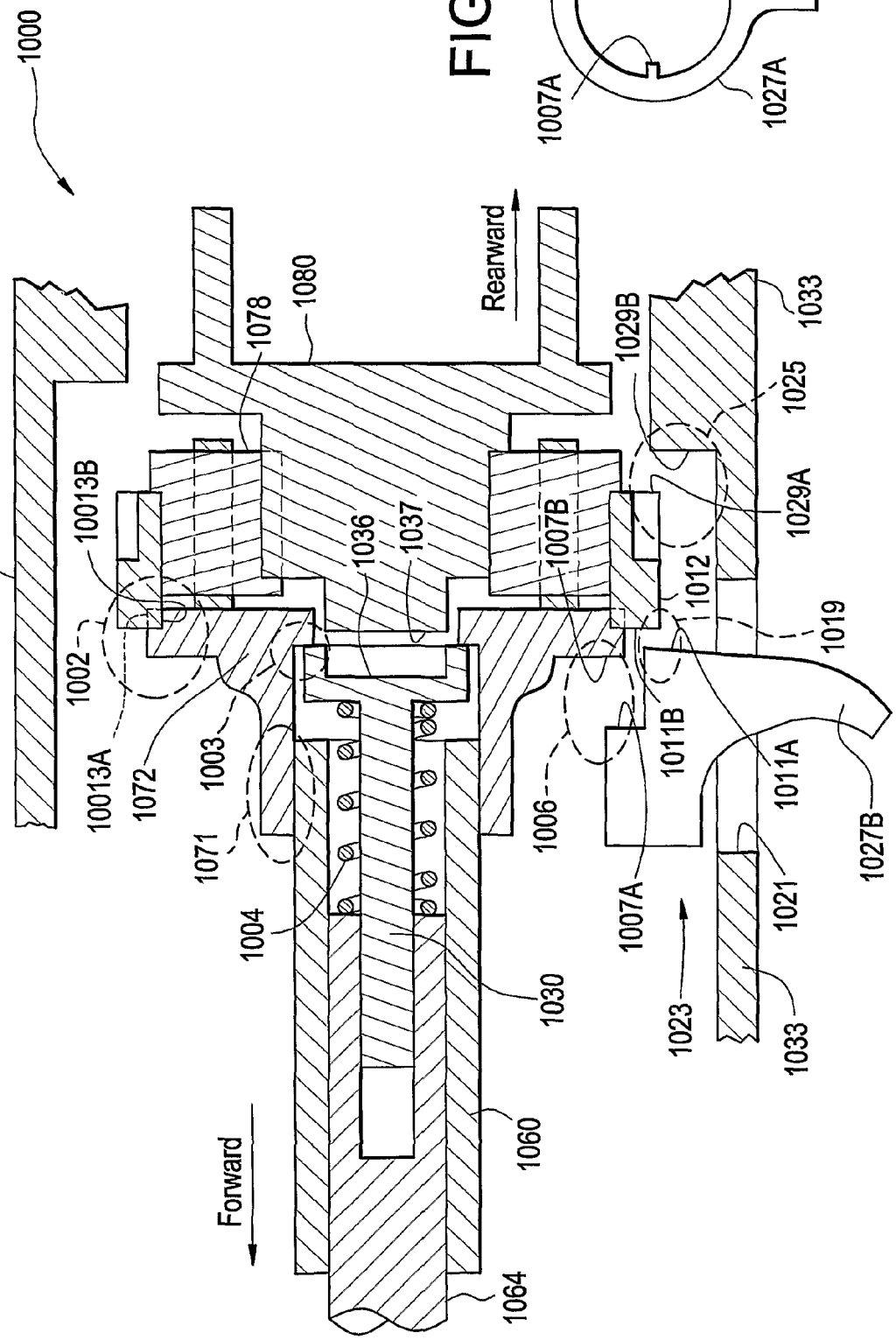

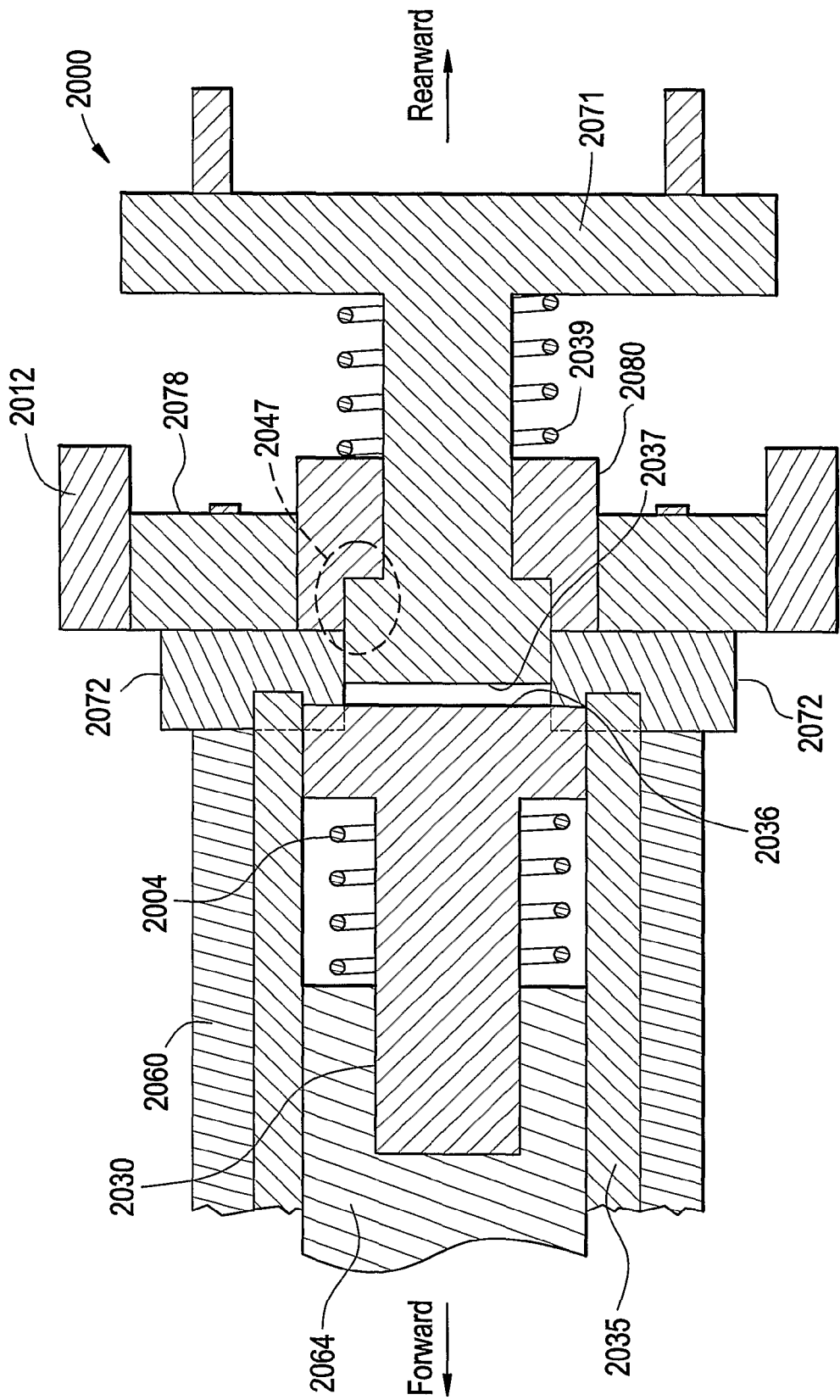

TRIGGER-STYLE PTO-ACTUATION

PRIORITY STATEMENT

This application claims the priority of U.S. patent application Ser. No. 60/672,532, filed on Apr. 19, 2005, the disclosure of which is incorporated herein in its entirety by reference.

Commonly-assigned, provisional Application, "TOOL CHUCK WITH POWER TAKE OFF FEATURE," U.S. Provisional Patent Application, was filed Sep. 16, 2005 with the USPTO and has been allotted Ser. No. 11/227,200, and is hereafter referred to as "the '200 application." Commonly-assigned, provisional Application, "TOOL CHUCK WITH POWER TAKE OFF AND DEAD SPINDLE FEATURES," was filed Apr. 19, 2005 with the USPTO and has been allotted Ser. No. 60/672,503, and is hereafter referred to as the "the '503 application." The entirety of each of the '200 and '503 applications also is hereby incorporated by reference.

BACKGROUND

The '200 application and the '503 application respectively teach power take off ("PTO") mechanisms for, e.g., drill/driver devices. In a chuck mode of operation of such a PTO-based drill/driver, power by which a chuck mechanism can be made to open/close jaws of the chuck may be obtained from, e.g., an (N−1)th stage (e.g., a second stage) of a planetary transmission, e.g., by moving an Nth stage (e.g., a third stage) sun gear forward along the longitudinal axis to engage and drive the chuck mechanism. Similarly, a drill/drive mode may be engaged by axially moving the third stage sun gear rearward.

As power is drawn from the third stage of the planetary transmission, PTO actuation necessitates that the tool transmission be set to a speed, e.g., low speed, in which the third stage of the planetary transmission is active. As such, the PTO actuation mechanism has been interlocked with the speed-selecting mechanism of the transmission.

SUMMARY

An embodiment of the present invention provides, in a power driver, a power take off (PTO) arrangement (to open/close a chuck) including: a chuck actuating shaft and a coaxial PTO actuator shaft axially displaceable along, yet rotationally locked together about, a first axis of the power driver; an input shaft, supporting jaws of the chuck, and concentric to at least a portion of the chuck actuating shaft and a portion of the PTO actuator shaft; relative rotation between the chuck actuating shaft and the input shaft selectively being prevented and being caused by first and second configurations of the chuck actuating shaft and the PTO actuator shaft, respectively; and a PTO-control member, displaceable between first and second positions along a second axis parallel to the first axis, and coupled to adjust at least one of the chuck actuating shaft and the PTO actuator to achieve the first and second configurations, respectively.

An embodiment of the present invention provides, in a power driver having a housing, a power take off (PTO) arrangement including: an input shaft supporting chuck jaws and mounted for rotation in the housing; a chuck actuating shaft mounted for rotation in the housing; a PTO actuator shaft rotationally locked to the chuck actuating shaft, the PTO actuator shaft being axially displaceable relative to the chuck actuating shaft between a first position in which the chuck actuating shaft is rotatable together with the input shaft, and a second position in which the chuck actuating shaft is rotatable relative to the input shaft; and a PTO-control member mounted for axial movement on the housing and coupled to move the PTO actuator shaft between the first and the second positions.

An embodiment of the present invention provides a power driver including: a housing; a tool chuck having an input shaft mounted for rotation on the housing and supporting chuck jaws, and a chuck actuating shaft mounted for rotation on the input shaft; a power take off mechanism connected to the tool chuck, the power take off mechanism being adjustable into a DRILL DRIVE MODE to rotationally drive the input shaft and the chuck actuating shaft together as a unit, and a CHUCK MODE to rotationally drive the chuck actuating shaft relative to the input shaft; and a power take off control member mounted for axial movement on the housing to move the power take off mechanism into the DRILL DRIVE MODE and the CHUCK MODE.

Additional features and advantages of the present invention will be more fully apparent from the following detailed description of example embodiments, the accompanying drawings and the associated claims.

BRIEF DESCRIPTION OF THE DRAWINGS

The accompanying drawings are intended to depict example embodiments of the present invention and should not be interpreted to limit the scope thereof. The accompanying drawings are not to be considered as drawn to scale unless explicitly noted. Like elements are represented by like reference numerals.

FIG. 1A is a longitudinal cross-section of a trigger-style axial PTO actuation assembly according to an example embodiment of the present invention, in a first relative position of the components thereof.

FIG. 1B is a front view of the trigger member of the PTO actuation assembly of FIG. 1A.

FIG. 2 is a longitudinal cross-section of a nose/ring-style of rotational PTO actuation assembly according to an example embodiment of the present invention, in a first relative position of the components thereof.

DETAILED DESCRIPTION OF EXAMPLE EMBODIMENTS

Figure 1C:
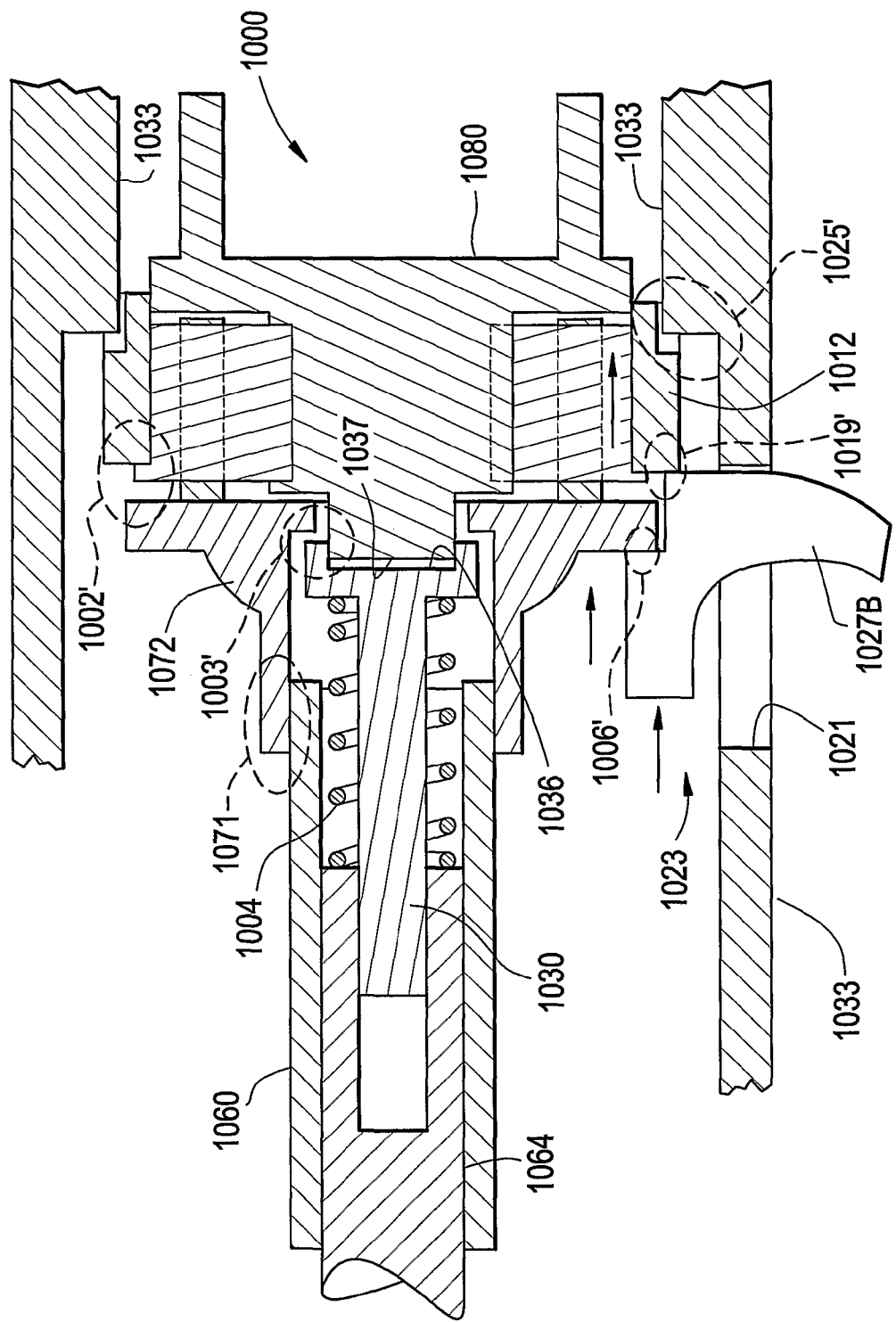
FIG. 1C is a longitudinal cross-section of the trigger-style axial PTO actuation assembly of FIG. 1A, in a second relative position of the components thereof.

It will be understood that if an element or layer is referred to as being "on," "against," "connected to" or "coupled to" another element or layer, then it can be directly on, against connected or coupled to the other element or layer, or intervening elements or layers may be present. In contrast, if an element is referred to as being "directly on", "directly connected to" or "directly coupled to" another element or layer, then there are no intervening elements or layers present. Like numbers refer to like elements throughout. As used herein, the term "and/or" includes any and all combinations of one or more of the associated listed items.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In some of the figures, reference numbers are reused where the same component may be used in more than one drawing. After a component is initially introduced and discussed, repetitive discussion of the component is kept to a minimum for the sake of brevity. Rather, further discussion focuses upon the new context in which the component is depicted in the additional drawing(s).

A PTO (again, power take off) actuation mechanism (e.g., for a power driver) does not necessarily have to be interlocked with the speed-selecting mechanism of the transmission. Embodiments of the present invention provide for PTO actuation via alternative mechanisms, as will be described below. For example, such alternative PTO actuation (or, in other words, chuck mode actuation) mechanisms can be based upon rotation or axial movement of a nose piece or ring located on the front of the tool, a sliding lever located near the motor switch (or, in other words, trigger), etc. While the '200 application and the '503 application respectively may move the Nth (e.g., third) stage carrier axially forward to achieve PTO, alternate PTO actuation mechanisms may move the third stage carrier axially rearward to achieve PTO.

FIG. 1A is a longitudinal cross-section of a trigger-style axial PTO actuation assembly 1000 according to an example embodiment of the present invention, in a first relative position of the components thereof that achieves a drill/drive mode of operation.

Figure 1D:
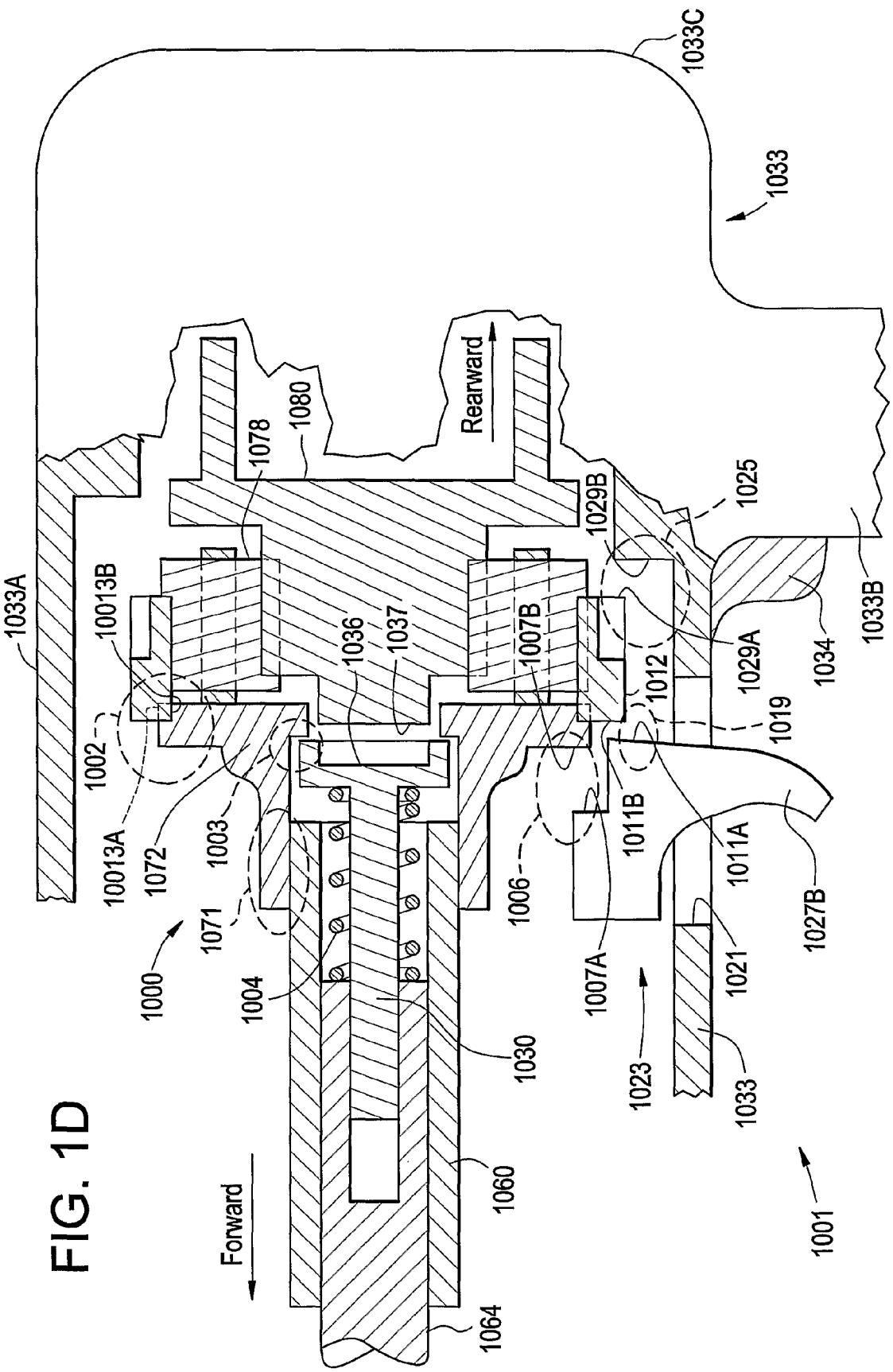
FIG. 1D is a longitudinal cross-section of the trigger-style axial PTO actuation assembly of FIG. 1A in the context of having been incorporated into a power driver, according ton an example embodiment of the present invention.

PTO actuation assembly 1000 can be used in a power driver; see, e.g., FIG. 1D where the power driver takes the form of a drill/driver. Such a power driver can include a transmission having N stages, e.g., N=3.

In FIG. 1A, a total of N stages, where N=3, is assumed. Trigger-style PTO actuation assembly 1000 may include: a third stage carrier 1072; a third stage sun gear 1080 that may be axially fixed; third stage planetary gears 1078; a third stage ring gear 1012; a PTO actuator shaft 1030; a chuck actuating shaft 1064; a hollow bore input shaft 1060; a housing 1033 having an aperture 1021 therein; a PTO-control member, e.g., a trigger member 1023 (see FIG. 1B); and a spring 1004 to push PTO actuator shaft 1030 axially rearward away from chuck actuating shaft 1064.

In the first relative position of the components depicted in FIG. 1A, third stage carrier 1072 is rotationally fixed with respect to input shaft 1060 by respective cooperating features, as called out at reference number 1071. Also, PTO actuator shaft 1030 is rotationally fixed with respect to third stage carrier 1072 by respective cooperating features, as called out at reference number 1003. As such, in FIG. 1A, PTO actuator shaft 1030 is rotationally fixed to third stage carrier 1072, i.e., different rotational speed between PTO actuator shaft 1030 and third stage carrier 1072 is prevented.

Third stage carrier 1072 can be biased into the position depicted in FIG. 1A. For example such a bias can be produced by, e.g., a spring-loaded arrangement (not depicted) that pushes/pulls directly against/on third stage carrier 1072 and/or another spring-loaded arrangement (not depicted) that pushes/pulls directly against/on a shift wire (not depicted) disposed in a circumferential channel (not depicted) in third stage carrier 1072, etc.

Third stage ring gear 1012 not only is engaged to third planetary gears 1078, but also is engaged to third stage carrier 1072, as called out by reference number 1002. More specifically feature 10013A of third stage carrier 1072 and feature 10013B of third stage ring gear 1012 cooperatively engage, respectively, which rotationally fixes third stage carrier 1072 to third stage sun gear 1080, i.e., prevents different rotational speed between third stage carrier 1072 and third stage sun gear 1080.

Third stage ring gear 1012 can be biased into the position depicted in FIG. 1A. For example such a bias can be produced by, e.g., a spring-loaded arrangement (not depicted) that pushes/pulls directly against/on third stage ring gear 1012 and/or another spring-loaded arrangement (not depicted) that pushes/pulls directly against/on a shift wire (not depicted) disposed in a circumferential channel (not depicted) in third stage ring gear 1012, etc.

PTO actuator shaft 1030 and third stage sun gear 1080 include features 1036 and 1037, respectively, that can be engaged, as will be discussed with respect to FIG. 1C. In FIG. 1A, however, features 1036 and 1037 are axially separated so as not to be engaged.

Trigger member 1023 includes: a feature 1007A that, with axial movement of trigger member 1023, can engage feature 1007B of third stage carrier 1072, as called out at reference number 1006; a feature 1011A that, with axial movement of trigger member 1023, can engage feature 1011B of third stage ring gear 1012, as called out at reference number 1019. Third stage ring gear 1012 further includes a feature 1029A that, with axial movement of third stage ring gear 1012, can engage feature 1029B of housing 1033, as called out at reference number 1025. Trigger member 1023 can be biased into the position depicted in FIG. 1A by, e.g., a spring-loaded arrangement (not depicted).

In the drill/drive mode, no relative rotation takes place between rotationally driven chuck actuating shaft 1064 and the rotationally driven chuck actuating screw (via chuck input shaft 1064) as they are each rotationally driven at the same speed. In the absence of such relative rotation, the chuck actuating screw is neither advanced nor retracted in the axial direction, hence the chuck jaws are neither caused to open nor to close.

FIG. 1B is a front view of trigger member 1023 of the PTO actuation assembly of FIG. 1A.

In FIG. 1B, trigger member 1023 has a cylindrical body portion 1027A and a dorsal-fin-like projection 1027B that extends beyond housing 1033 for manipulation by a user.

FIG. 1C is a longitudinal cross-section of the trigger-style axial PTO actuation assembly of FIG. 1A, in a second relative position of the components thereof that achieves a chuck mode of operation.

In FIG. 1C, a user has moved projection 1027B of trigger member 1023 axially rearward. Feature 1007A of trigger 1023 now abuts feature 1007B of third stage carrier 1072, as called out at reference number 1006'. Feature 1011A now abuts feature 1011B of third stage ring gear 1012, as called out at reference number 1019'. Feature 1029A of third stage ring gear 1012 now abuts feature 1029B of housing 1033, as called out at reference number 1025'.

In the second relative position depicted in FIG. 1C of the components of trigger-style PTO actuation assembly 1000, third stage carrier 1072 remains rotationally fixed with respect to input shaft 1060 by respective cooperating features, as again called out at reference number 1071. But third stage carrier 1072 is no longer rotationally fixed with respect to PTO actuator shaft 1030, as called out at reference number 1003'. As such, different rotational speed between PTO actuator shaft 1030 and third stage carrier 1072 is possible.

In FIG. 1C, third stage ring gear 1012 remains engaged to third stage planetary gears 1078, but also is no longer engaged to third stage carrier 1072 as called out by reference number 1002'. As such, third stage carrier 1072 is no longer rotationally fixed to third stage sun gear 1080, i.e., different rotational speed between third stage carrier 1072 and third stage sun gear 1080 is possible. PTO actuator shaft 1030 and third stage sun gear 1080 include features 1036 and 1037, respectively, that are engaged to rotationally fix the two component parts together.

A user may then power up driver that includes trigger-style PTO actuation assembly 1000. At this time, third stage sun gear 1080 may rotationally drive third stage carrier 1072 (via third stage planetary gears 1078), which in turn may rotationally drive input shaft 1060 (and thus chuck jaws and a chuck actuating screw). At same time, third stage sun gear 1080 may rotationally drive PTO actuator shaft 1030, which in turn may rotationally drive chuck actuating shaft 1064.

As is well known in this art, one rotation of third stage sun gear 1080 may cause (via third stage planetary gears 1078) only a fractional rotation of third stage carrier 1072. In other words, relative to driver housing 1033, third stage sun gear 1080 (and thus PTO actuating shaft 1030 and chuck actuating shaft 1064) may rotate faster than third stage carrier 1072 (and thus input shaft 1060, the chuck jaws and the chuck actuating screw). The speed differential between rotationally driven chuck actuating shaft 1064 and rotationally driven chuck actuating screw (via input shaft 1060) may result in a relative rotation between these two component parts. This relative rotation may advance or retract chuck actuating screw in axial direction (depending on rotation direction of the transmission output) to open or close the chuck jaws.

In FIGS. 1A and 1C, the drill/drive mode can be, e.g., in a high speed setting. When trigger member 1023 is moved axially rearward, features 1007A and 1011A thereof push third stage carrier 1072 and third stage ring gear 1012, respectively, rearward. This forces third stage ring gear 1012 out of engagement with third stage carrier 1072 and into engagement with housing 1033. This action may override the high speed setting and may reactivate the third stage reduction.

To summarize, in a drill/driver mode:
chuck actuating shaft 1064 is rotationally locked to PTO actuator shaft 1030
PTO actuator shaft 1030 is disengaged from sun gear 1080
hollow bore (outer concentric) input shaft 1060 is rotationally locked (see callout 1071) to carrier 1072
   carrier 1072 is rotationally locked (see callout 1003) to PTO actuator shaft 1030
   carrier 1072 is rotationally locked (see callout 1002) to ring gear 1012
   ring gear 1012 is rotationally unlocked (see callout 1025) from housing 1033
sun gear 1080 rotates planet gears 1078
   carrier 1072 supports planet gears 1078
     planet gears 1078 mesh with rotationally fixed ring gear 1012
       ring gear 1012 is (again) rotationally locked to carrier 1072
Thus, carrier 1072 rotates at the same speed as sun gear 1080

To summarize, in a chuck mode:
chuck actuating shaft 1064 is rotationally locked to PTO actuator shaft 1030
trigger member 23 has been moved axially rearward so that
   its feature 1007A abuts (see callout 1006') feature 1007B of carrier 1072, and
   its feature 101 1A abuts (see callout 1019') feature 1011B of ring gear 1012
Consequently, carrier 1072 and ring gear 1012 each have been moved axially rearward
   PTO actuator shaft 1030 is then rotationally unlocked (see callout 1003') from carrier 1072
   PTO actuator shaft 1030 is then moved axially rearward to be rotationally locked (see callout 1003') to sun gear 1080
hollow bore (outer concentric) input shaft 1060 to be rotationally locked (see callout 1071) to carrier 1072
   carrier 1072 supports planet gears 1078
     planet gears 1078 mesh with rotationally fixed (see below) ring gear 1012
     ring gear 1012 is rotationally unlocked (see callout 1002') from carrier 1072
     ring gear 1012 is fixed (see callout 1025) to housing 1033
Thus, carrier 1072 rotates slower than sun gear 1080 because of reduction by planet gears 1078

FIG. 1D is a longitudinal cross-section of trigger-style axial PTO actuation assembly 1000 of FIG. 1A in the context of having been incorporated into a power driver 1001, according to an example embodiment of the present invention.

In FIG. 1D, more of driver housing 1033 has been, specifically including an upper portion 1033A, a lower portion 1033B and a rearward portion 1033C. Lower portion 1033B is configured as a pistol type of grip comfortable to a user's hand. Arranged to extend through lower housing portion 1033B is a trigger switch 1034 by which a motor (not depicted) can be controllably energized. Trigger switch 1034 and lower housing portion 1033B can be disposed, e.g., sufficiently close to trigger member 1023 so that a user's hand could remain substantially closed around lower portion 1033B and yet a finger could be extended to pull on trigger member 1023 while another finger pulls on trigger switch 1034. Alternatively, one or more further structures can be provided so that if trigger member 1023 is moved, then trigger switch 1034 is moved as well.

FIG. 2 is a longitudinal cross-section of a nose/ring-style of rotational PTO actuation assembly 2000 according to an example embodiment of the present invention.

In FIG. 2, PTO actuation assembly 2000 is depicted in a first relative position of the components thereof that achieves, when incorporated into a power driver, a drill/drive mode of operation.

In FIG. 2, nose/ring-style rotational PTO actuation assembly 2000 may include: an Nth stage (e.g., a third stage) carrier 2072; a third stage sun gear 2080; an (N−1)th stage (e.g., a second stage) carrier 2071; third stage planetary gears 2078; a third stage ring gear 2012; a PTO actuator shaft 2030; a chuck actuating shaft 2064; an input shaft 2060; push pins 2035; a spring 2004 to push PTO actuator shaft 2030 axially rearward away from chuck actuating shaft 2064; and a spring 2039 to push second stage carrier 2071 axially rearward away from third stage sun gear 2080.

A user may activate a chuck mode for nose/ring-style rotational PTO actuation assembly 2000 as follows. A nose piece (not shown) and/or a ring (not shown) may be rotated by the user, e.g., which moves a different portion of a camming surface into contact with distal ends (not shown) of push pins 2035 (proximal ends of which are depicted in FIG. 2). Push pins 2035 are then caused to move axially rearward such that proximal ends thereof push against third stage carrier 2072.

Third stage sun gear 2080 may correspondingly be moved axially and independently of second stage carrier 2071. Second stage carrier 2071 and third stage sun gear 2080 now represent a spring-loaded sub-assembly. Third stage sun gear 280 is normally biased forward by spring 2039 and engages (as called out by reference number 2047) drive features on the rearward facing, forward end of second stage carrier 2071. The forward end of second stage carrier 2071 also has a forward facing engagement feature 2037 that may selectively engage a rearward facing engagement feature 2036 on PTO actuator shaft 2030.

Moving third stage carrier 2072 rearward may push third stage sun gear 2080 out of engagement with second stage carrier 2071, while simultaneously allowing PTO actuator shaft 2030 to move rearward so that feature 2036 thereof may engage feature 2037 of second stage carrier 2071. Third stage carrier 2072 may move farther rearward than PTO actuator shaft 2030 such that PTO actuator shaft 2030 may disengage from third stage carrier 2072, thus allowing PTO to be actuated. In the chuck mode, input shaft 2060 is no longer driven by the third stage of the transmission and thus may be constrained by a spindle lock (not depicted) so as to achieve a dead spindle effect.

Figure 3A:
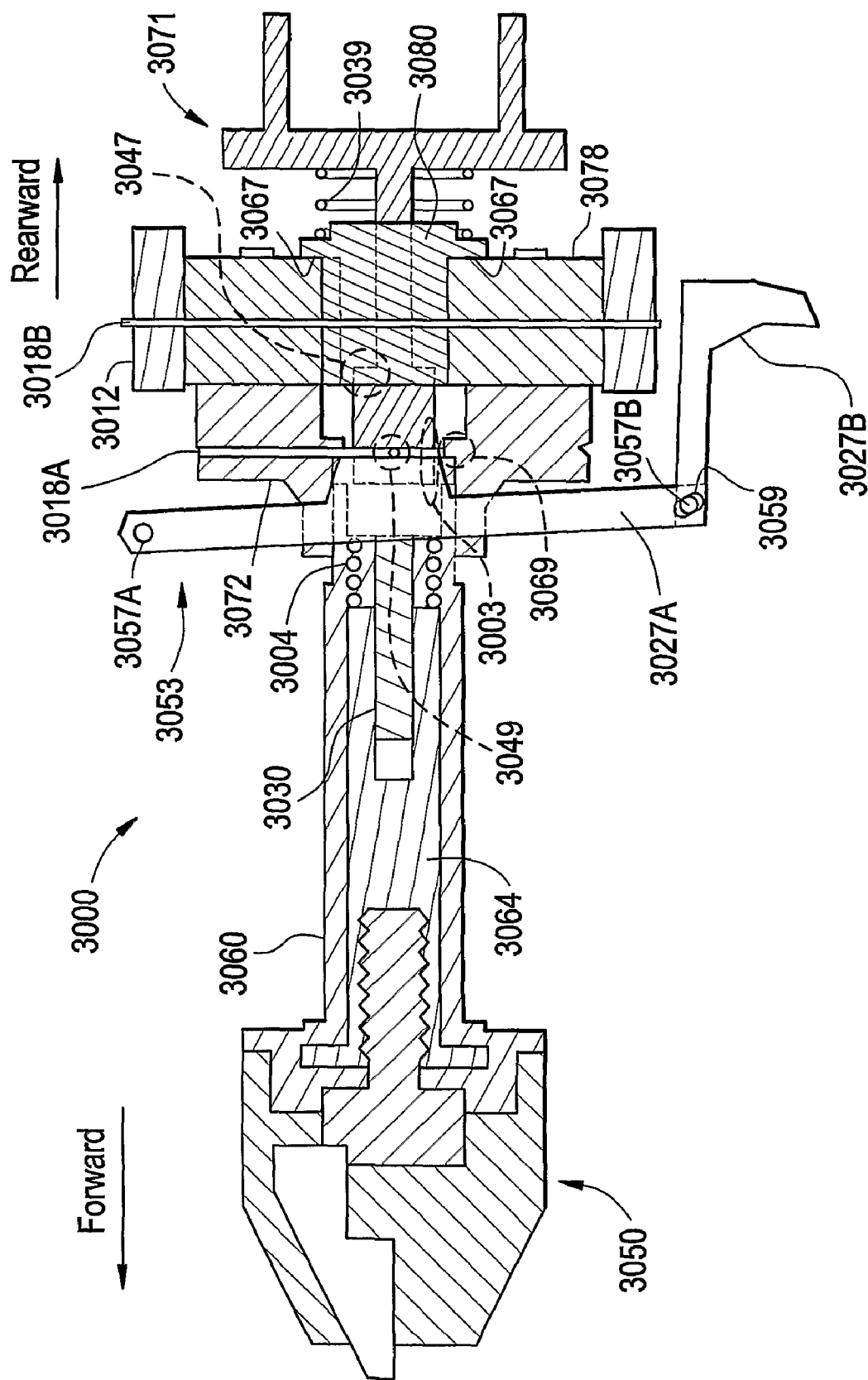
FIG. 3A is a longitudinal quasi-cross-section of another trigger-style axial PTO actuation assembly according to an example embodiment of the present invention, in a first relative position of the components thereof.
Figure 3B:
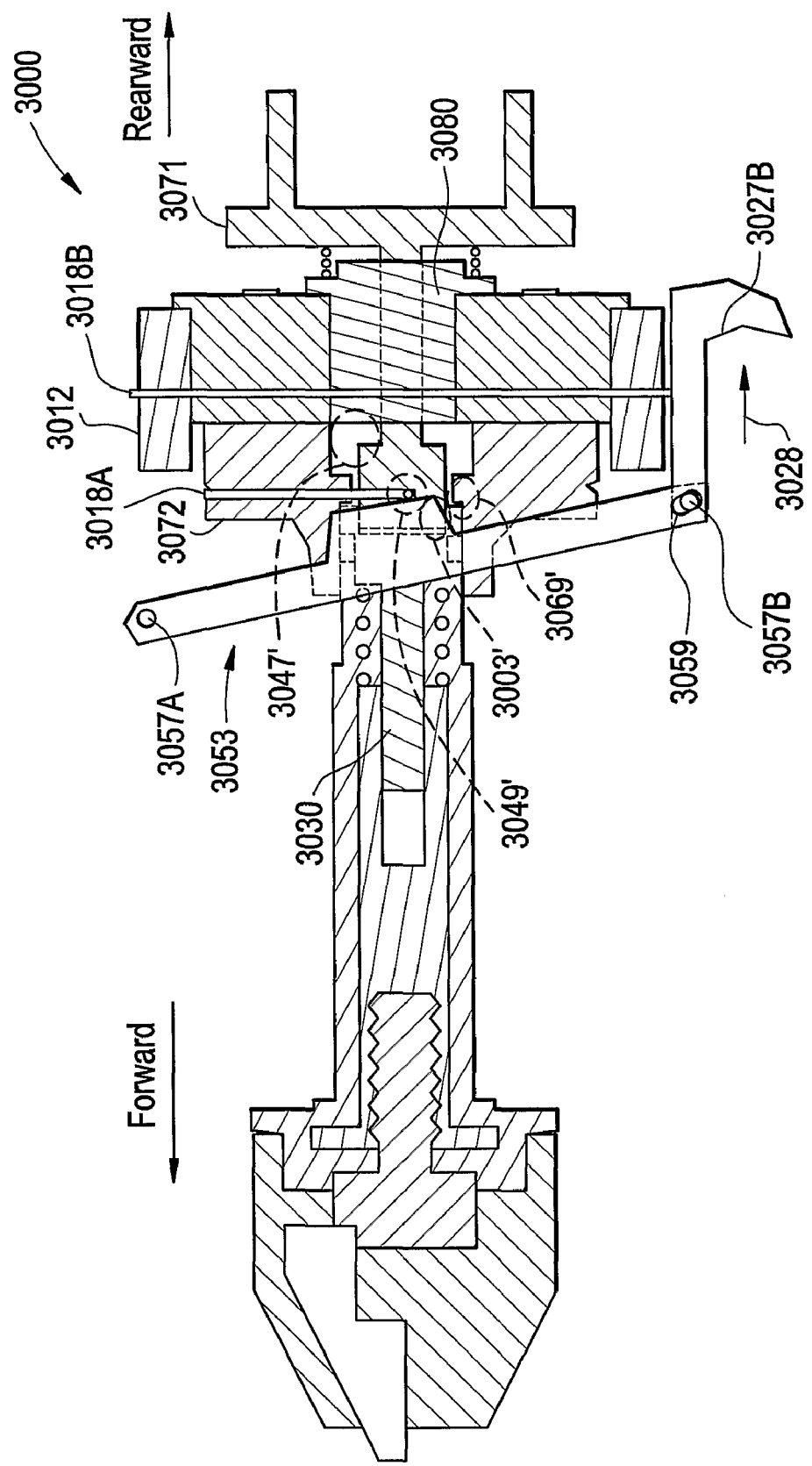
FIG. 3B is a longitudinal quasi-cross-section of the trigger-style axial PTO actuation assembly of FIG. 3A, in a second relative position of the components thereof.

FIG. 3A is a longitudinal quasi-cross-section of another trigger-style axial PTO actuation assembly 3000 according to an example embodiment of the present invention. FIG. 3B is a longitudinal quasi-cross-section of trigger-style axial PTO actuation assembly 3000, in a second relative position of the components (relative to FIG. 3A) that achieves a chuck mode of operation.

In FIG. 3A, PTO actuation assembly 3000 is depicted in a first relative position of the components thereof that achieves, when incorporated into a power driver, a drill/drive mode of operation.

Trigger-style PTO actuation assembly 3000 may include: an Nth stage (e.g., a third stage) carrier 3072; a shift wire 3018A (cooperatively engaging a circumferential recess (not shown) in carrier 3072) that may be used to induce axial movement, e.g., as described in the '503 application; a third stage sun gear 3080; third stage planetary gears 3078; a third stage ring gear 3012; a shift wire 3018B cooperatively engaging a circumferential recess (not shown) in ring gear 3012; an (N−1)th stage (e.g., a second stage) carrier 3071; a chuck sub-assembly 3050; a PTO actuator shaft 3030; a chuck actuating shaft 3064; an input shaft 3060; a trigger member 3053 (see FIG. 4); a spring 3004 to push PTO actuator shaft 3030 axially rearward away from chuck actuating shaft 3064; and a spring 3039 to push second stage carrier 3071 axially rearward away from third stage sun gear 3080.

In the first relative position of the components depicted in FIG. 3A, third stage carrier 3072 is rotationally fixed with respect to PTO actuator shaft 3030 by respective cooperating features, as called out at reference number 3069. Also, PTO actuator shaft 3030 is not rotationally fixed with respect to second stage carrier 3071 because respective cooperating features, as called out at reference number 3003, are not engaged. As such, in FIG. 3A, PTO actuator shaft 3030 is rotationally fixed to third stage carrier 3072, i.e., different rotational speed between PTO actuator shaft 3030 and third stage carrier 3072 is prevented. Second stage carrier 3071 is rotationally fixed with respect to third stage sun gear 3080 by respective cooperating features, as called out at reference number 3047.

Also in FIG. 3A, an outwardly extending (relative to an outer circumference of carrier 3072) end of shift wire 3012 can abut a surface of trigger member 3053, thus defining respective cooperating features, as called out at reference number 3049. Such cooperating features represent a coupling by which trigger member 3053 can be used to move carrier 3072 axially rearward.

Figure 4:
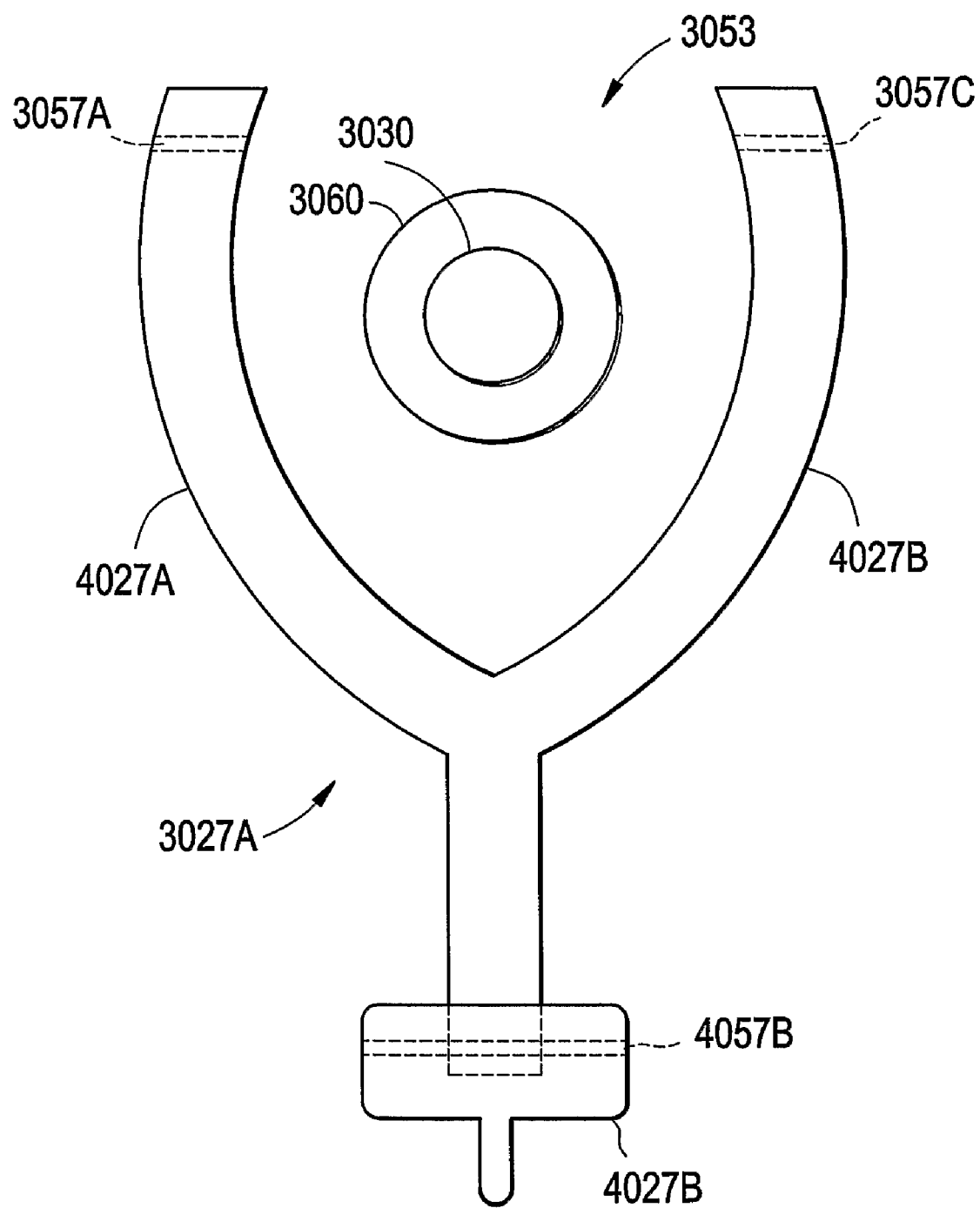
FIG. 4 is a front view of the trigger member of the PTO actuation assembly of FIG. 3A.

FIG. 4 is a front view of the trigger member of the PTO actuation assembly of FIG. 3A.

In FIGS. 3A, 3B and 4, trigger member 3053 includes: a wishbone-shaped portion 3027A; and a dorsal-fin-like projection 3027B that extends beyond housing (not shown in FIGS. 3A, 3B and 4) for manipulation by a user. Wishbone-shaped portion 3027A includes a left-portion 4027A and a right-portion 4027B. PTO actuator shaft 3030 and input shaft 3060 can be described as being located in the fork of wishbone-shaped portion 3027A.

Portions 4027A and 4027B of trigger member 3053 include apertures that receive pins 3057A and 3057C about which pivoting occurs. Wishbone-shaped portion 3027A further includes a slot 3059 (see FIG. 3A) which receives a pin 4057B about which pivoting occurs. Pin 4057B is also received by an aperture in projection 3027B of trigger member 3053. Slot 3059 is provided to promote substantially planar axial travel of projection 3027B, rearward such travel being called out at reference number 3028.

Attention now turns to FIG. 3B, which (again) shows trigger-style axial PTO actuation assembly 3000 in a second relative position of the components (relative to FIG. 3A) that achieves a chuck mode of operation.

In FIG. 3B, trigger member 3053 has been pivoted rearwardly about pins 3057A. This has caused the outwardly extending end of shift wire 3018A to move down the surface of trigger member 3053 which shift wire 3018A abuts, as called out at reference number 3049'. Consequently, carrier 3072 has been moved axially rearward relative to FIG. 3A. Also consequently, spring 3004 has moved PTO actuator shaft 3030 axially rearward.

Spring 3039 biases third stage sun gear 3080 axially forward toward third stage planetary gears 3078, which consequently biases third stage carrier 3072 forward. It is noted that a circumferential flange 3067 on third stage sun gear 3080 may capture third stage planetary gears 3078 and may make it unnecessary to provide special pins with heads otherwise to retain third stage planetary gears 3078 on third stage carrier 3072.

In FIG. 3B, PTO actuator shaft 3030 is rotationally fixed with respect to second stage carrier 3071 because respective cooperating features, as called out at reference number 3003', are now engaged. Third stage carrier 3072 is no longer rotationally fixed with respect to PTO actuator shaft 3030 as the respective cooperating features are no longer engaged, as called out at reference number 3069'. And second stage carrier 3071 is no longer rotationally fixed with respect to third stage sun gear 3080 as the respective cooperating features are no longer engaged, as called out at reference number 3047'.

In the chuck mode of FIG. 3B, input shaft 3060 is no longer driven by the third stage of the transmission and thus may be constrained by a spindle lock (not depicted) so as to achieve a dead spindle effect.

With some example embodiments of the present invention having been thus described, it will be obvious that the same may be varied in many ways. Such variations are not to be regarded as a departure from the spirit and scope of the present invention, and such modifications are intended to be included within the scope of the present invention.

What is claimed is:

1. In a power driver, a power take off (PTO) arrangement to open/close a chuck, the PTO arrangement comprising: a chuck actuating member and a coaxial PTO actuator member axially displaceable along, yet rotationally locked together about, a first axis of the power driver; an input member, supporting jaws of the chuck, and concentric to at least a portion of the chuck actuating member and a portion of the PTO actuator member; relative rotation between the chuck actuating member and the input member selectively being prevented and being caused by first and second configurations of the chuck actuating member and the PTO actuator member, respectively; and a PTO-control member, displaceable between first and second positions along a second axis parallel to the first axis, and coupled to adjust at least one of the chuck actuating member and the PTO actuator to achieve the first and second configurations, respectively, wherein the PTO arrangement further includes a sun gear, a carrier, planet gears and a ring gear; the sun gear being selectively engageable with the PTO actuator member.

2. The PTO arrangement of claim 1, further comprising: an Nth stage of a transmission wherein the carrier is rotationally locked to the input member and selectively engageable with the PTO actuator member; and the ring gear is selectively engageable with the carrier.

3. The PTO arrangement of claim 2, wherein, in the first configuration, the following is true: the sun gear is disengaged from the PTO actuator member; the carrier is directly engaged with the PTO actuator member; and the ring gear is directly engaged with the carrier.

4. The PTO arrangement of claim 3, wherein, in the first configuration, the following also is true: the ring gear is disengaged from a housing of the power driver.

5. The PTO arrangement of claim 3, wherein, in the first configuration, the PTO-control member is disengaged from the carrier and the ring gear.

6. The PTO arrangement of claim 2, wherein, in the second configuration, the following is true: the sun gear is directly engaged with the PTO actuator member; the carrier is disengaged from the PTO actuator member; and the ring gear is disengaged from the carrier.

7. The PTO arrangement of claim 6, wherein, in the second configuration, the following also is true: the ring gear is engaged with a housing of the power driver.

8. The PTO arrangement of claim 6, wherein, in the second configuration, at least one of the following also is true: the PTO-control member directly engages the carrier to disengage the same from the PTO actuator member by the PTO-control member; and the PTO-control member directly engages the ring gear to disengage the same from the carrier.

9. The PTO arrangement of claim 6, further comprising: a first shift wire engaged in a circumferential recess of the carrier; a second shift wire engaged in a circumferential recess of the ring gear; and linkage between a housing of the power driver and the PTO-control member; wherein, in the second position of the PTO-control member, one or more camming surfaces of the linkage bears against the first shift wire to disengage the carrier from the PTO actuator member, and cooperating features on the linkage and the second shift wire disengage the ring gear from the carrier.

10. The PTO arrangement of claim 9, wherein the linkage includes: one or more first rods pivotably mounted to the housing, each first rod including an instance of the one or more camming surfaces that bears against the first shift wire; a second member pivotably connected to the one or more first rods, displaceable along a third axis parallel to the first axis, and having one or more instances of the cooperating features.

11. The PTO arrangement of claim 10, wherein a portion of the second member is trigger-shaped and is disposed outside the housing of the power driver so as to be movable between by a hand.

12. The PTO arrangement of claim 10, wherein the one or more first members collectively exhibit a wishbone shape.

13. The PTO arrangement of claim 1, wherein the PTO-control member is annular.

14. The PTO arrangement of claim 13, wherein an interior surface of annular PTO-control member includes one or more features selectively engageable to induce the first and second configurations, respectively.

15. The PTO arrangement of claim 1, wherein a portion of the PTO-control member is trigger-shaped and is disposed outside a housing of the power driver so as to be movable from the first position to the second position by a hand.

16. The PTO arrangement of claim 15, wherein a remaining portion of the PTO-control member is annular and is disposed within the housing.

17. The PTO arrangement of claim 15, wherein: the housing includes a pistol grip; the trigger-shaped PTO-control member is disposed sufficiently proximal to the pistol grip so as to be moveable by a hand that also is holding the pistol grip.

18. The PTO arrangement of claim 17, wherein the power driver further includes a motor-control trigger extending outside the housing and disposed between the pistol grip and the trigger-shaped PTO-control member.

19. The PTO arrangement of claim 1, further comprising: one or more spring members to bias the chuck actuating member and the input member towards the first configuration.

20. The PTO arrangement of claim 1, further comprising: an Nth stage of a transmission including a sun gear and a carrier; and an (N−1)th stage including a carrier, the (N−1)th carrier being selectively directly engageable with the Nth sun gear, and the (N−1)th carrier selectively being directly engageable with the PTO actuator member.

21. The PTO arrangement of claim 20, wherein, in the first configuration, the following is true: the (N−1)th carrier is disengaged from the PTO actuator member; the Nth carrier is directly engaged with the PTO actuator member; and the Nth sun gear is directly engaged with the (N−1)th carrier.

22. The PTO arrangement of claim 21, wherein: one or more instances of the PTO-control member are provided; the one or more PTO-control members, in the first configuration, are disengaged from the Nth carrier.

23. The PTO arrangement of claim 20, wherein, in the second configuration, the following is true: the (N−1)th carrier is directly engaged with the PTO actuator member; the Nth carrier is disengaged from the PTO actuator member; and the Nth sun gear is disengaged from the (N−1)th carrier.

24. The PTO arrangement of claim 23, wherein: one or more instances of the PTO-control member are provided; the one or more PTO-control members, in the second position, bear against the (N−1)th carrier to disengage the same from the PTO actuator member.

25. The PTO arrangement of claim 20, further comprising: one or more spring members to bias the sun gear into engagement with the (N−1)th carrier.

26. The PTO arrangement of claim 1, wherein the input member has a hollow bore configuration.

27. In a power driver having a housing, a power take off (PTO) arrangement comprising: an input member supporting chuck jaws and mounted for rotation in the housing; a chuck actuating member mounted for rotation in the housing; a PTO actuator member rotationally locked to the chuck actuating member, the PTO actuator member being axially displaceable relative to the chuck actuating member between a first position in which the chuck actuating member is rotatable together with the input member, and a second position in which the chuck actuating member is rotatable relative to the input member; and a PTO-control member mounted for axial movement on the housing and coupled to move the PTO actuator member between the first and the second positions.

28. A power driver comprising: a housing; a tool chuck having an input member mounted for rotation on the housing and supporting chuck jaws, and a chuck actuating member mounted for rotation on the input member; a power take off mechanism connected to the tool chuck, the power take off mechanism being adjustable into a DRILL DRIVE MODE to rotationally drive the input member and the chuck actuating member together as a unit, and a CHUCK MODE to rotationally drive the chuck actuating member relative to the input member; and a power take off control member mounted for axial movement on the housing to move the power take off mechanism into the DRILL DRIVE MODE and the CHUCK MODE, wherein the power driver further includes a sun gear, a carrier, planet gears and a ring gear; the sun gear being selectively engageable with the PTO actuator member.

* * * * *